UNITED STATES PATENT OFFICE.

CHARLES S. BRADLEY, OF NEW YORK, N. Y.

REDUCING AGENT AND METHOD OF PRODUCING SAME.

1,253,775.  Specification of Letters Patent.  Patented Jan. 15, 1918.

No Drawing. Application filed March 13, 1913, Serial No. 754,100. Renewed June 7, 1917. Serial No. 173,418.

*To all whom it may concern:*

Be it known that I, CHARLES S. BRADLEY, a citizen of the United States, and a resident of the borough of Manhattan, city, county, and State of New York, have invented certain new and useful Improvements in Reducing Agents and Methods of Producing Same, of which the following is a full and clear specification.

My invention relates to metallurgical reduction and comprises in general an improved reducing agent and the method of producing the same.

One of the objects of my invention is to provide an effective reducing agent, more especially for metallurgical operations, which may be economically produced and employed.

In the chemical concentration of ore values, for example, it frequently happens that variable valency compounds are obtained in solution and it is desired to reduce the high valency compounds.

My invention is especially suited to the reduction of variable valency compounds in ore concentrating methods, as will be shown, but it is further capable of application in many other operations and it is not to be understood as limited to its use in connection with the chemical concentration of ore values. For illustration, however, I shall refer to its use in reducing high valency compounds of ore values in solution.

For the sake of economy it is usually preferable to employ, as far as possible, in ore concentrating methods, the materials which are present in the ore or are associated therewith. Limestone, for example, is plentiful and frequently found in the neighborhood of ore concentrating operations, and hence is usually available at comparatively small expense. Again, pyrite is often present in the ore and hence is likewise available. According to my invention I am able to employ these two materials for the production of a cheap and effective reducing agent.

Burnt lime, either produced in the plant or purchased outside is mixed with pyrite and heated to a low red heat. The two substances then react together, forming ferrous sulfid, calcium sulfid and calcium sulfate, as follows:

This reaction is practically complete, upward of 90% efficiency having been obtained in practice.

The mixture of calcium and iron sulfids, with calcium sulfate need not be subjected to any further treatment for separating the constituent parts, but according to my invention the mixture is employed as the reducing agent. While the calcium sulfate is not of any effect as a reducing agent, still its presence in the mixture is not of consequence, and if desired, it may for example, be removed from solutions in which the mixture has been employed to reduce variable valency compounds, prior to the productions of precipitates of the values.

Assuming an example of the invention, in which a solution of cupric chlorid in calcium chlorid is to be subjected to a reducing operation, the mixture of ferrous sulfid, calcium sulfid and calcium sulfate, forming the reducing agent, is introduced into the cupric chlorid solution which is preferably at a temperature near the boiling point. The ferrous sulfid and calcium sulfid immediately react strongly with the cupric chlorid, in accordance with the following equation, omitting the calcium chlorid solution and calcium sulfate:

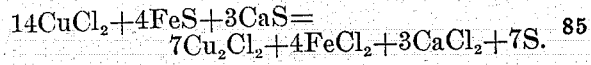

This reaction goes on with great energy, both the calcium and the iron taking on chlorin from the cupric chlorid, thus reducing the cupric chlorid to cuprous chlorid. The calcium chlorid solution is at the same time regenerated.

Pyrite frequently carries more or less copper sulfid, and it will be observed that the copper sulfid will also act as a reducing agent for cupric chlorid in accordance with the equation:

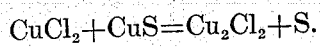

Therefore any copper sulfid which was present in the pyrite will not only reduce the cupric chlorid, but its copper content will form an increment of copper values in the solution.

As an example of the embodiment of my invention in the reduction of iron compounds, I may refer to the treatment of ferric chlorid in calcium chlorid solution. The reaction proceeds in a manner similar to that shown in the case of cupric chlorid reduction, and may be represented as follows:

$$7Fe_2Cl_6 + 4FeS + 3CaS = 3CaCl_2 + 18FeCl_2 + 7S.$$

It is preferable to have the solution heated to near the boiling point. The carrier solution and the calcium sulfate are likewise omitted in this equation. The reaction takes place with great energy, as before, and calcium and iron of the sulfids unite with chlorin of the ferric chlorid, setting free sulfur and regenerating the calcium chlorid. The iron of the sulfid in this reaction produces an increment of the ferrous chlorid values.

It should be noted in connection with the two examples of reduction given above, that the ferrous chlorid will under proper conditions cause a further reduction of cupric chlorid, or it may be employed as a reducing agent in a separate system. In the presence of calcium carbonate, for example, cupric chlorid is reduced by ferrous chlorid to cuprous chlorid, with formation of ferric hydrate, calcium chlorid and carbon dioxid. Omitting the water of hydration, the reaction may be expressed as follows:

$$2CuCl_2 + 2FeCl_2 + 3CaCO_3 = Fe_2O_3 + 3CaCl_2 + Cu_2Cl_2 + 3CO_2.$$

From this it will be seen that my invention may be applied to the production of ferrous chlorid for use as a reducing agent for substances having greater avidity than the iron for the acid radical employed as the solvent.

What I claim is:

1. A reducing agent comprising as essential ingredients ferrous sulfid and calcium sulfid.

2. A reducing agent comprising as essential ingredients four parts ferrous sulfid and three parts calcium sulfid.

3. A reducing agent comprising a mixture of calcium sulfate, ferrous sulfid and calcium sulfid.

4. The method of producing reducing agents, which comprises heating together pyrite and burnt lime to produce a mixture of ferrous sulfid, calcium sulfid and calcium sulfate.

5. The method of producing reducing agents, which comprises heating together at low red heat pyrite and burnt lime to produce a mixture of ferrous sulfid, calcium sulfid and calcium sulfate.

6. The method of producing reducing agents, which comprises heating together equal parts of pyrite and burnt lime to produce a mixture of ferrous sulfid, calcium sulfid and calcium sulfate.

7. The method of producing reducing agents, which comprises heating together at low red heat, equal parts of pyrite and burnt lime to produce a mixture of ferrous sulfid, calcium sulfid and calcium sulfate.

CHARLES S. BRADLEY.

Witnesses:
OCTAVIUS KNIGHT,
M. G. CRAWFORD.

Copies of this patent may be obtained for five cents each, by addressing the "Commissioner of Patents, Washington, D. C."